Figure 1:
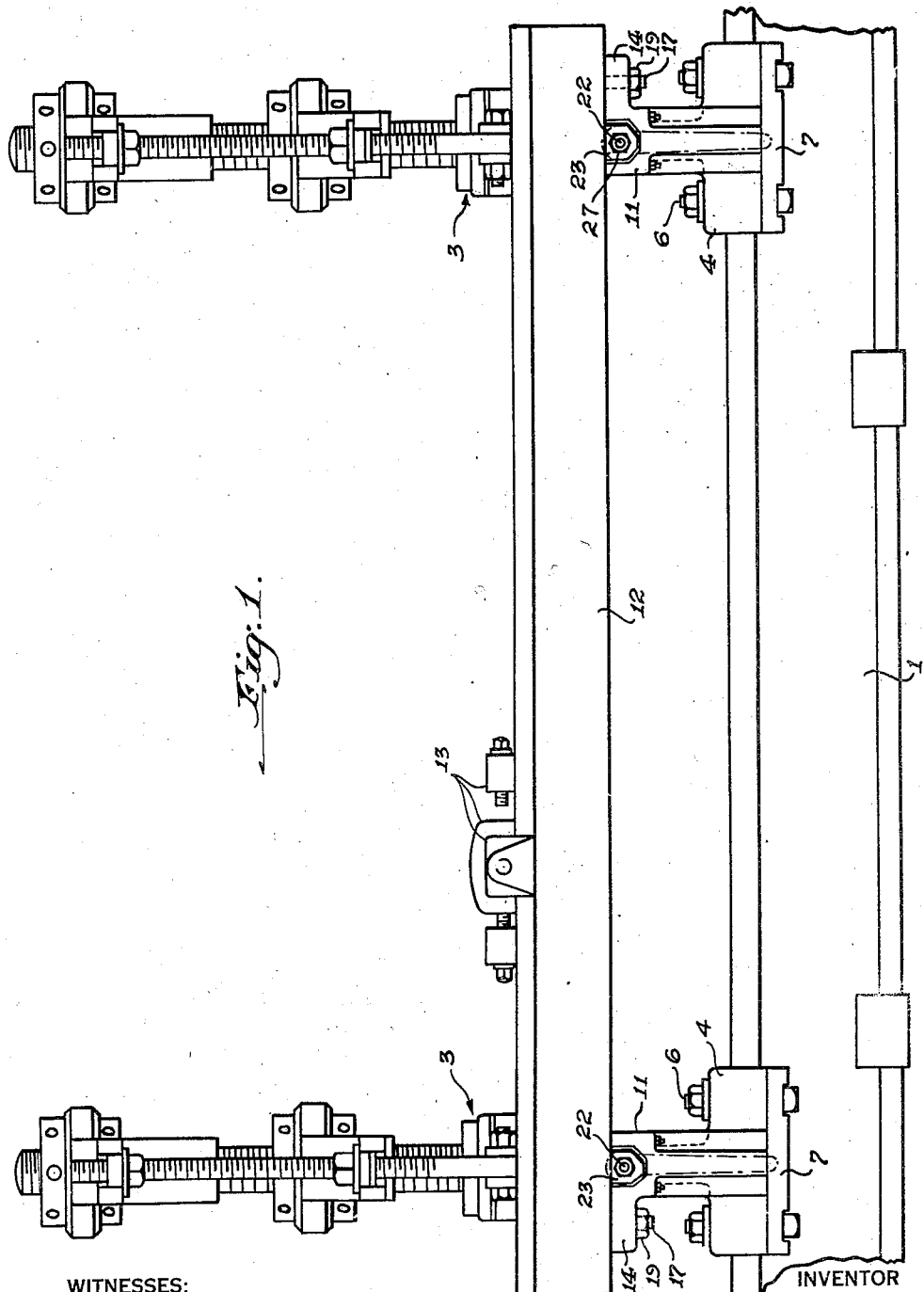

Dec. 31, 1946.  W. R. DUDA  2,413,489
ROLL LATHE
Filed Aug. 2, 1945  4 Sheets-Sheet 1

WITNESSES:
E. J. Maloney
V. A. Peckham

INVENTOR
Wentzel R. Duda
BY
Brown, Critchlow & Flick
his ATTORNEYS.

Dec. 31, 1946.   W. R. DUDA   2,413,489
ROLL LATHE
Filed Aug. 2, 1945   4 Sheets-Sheet 3
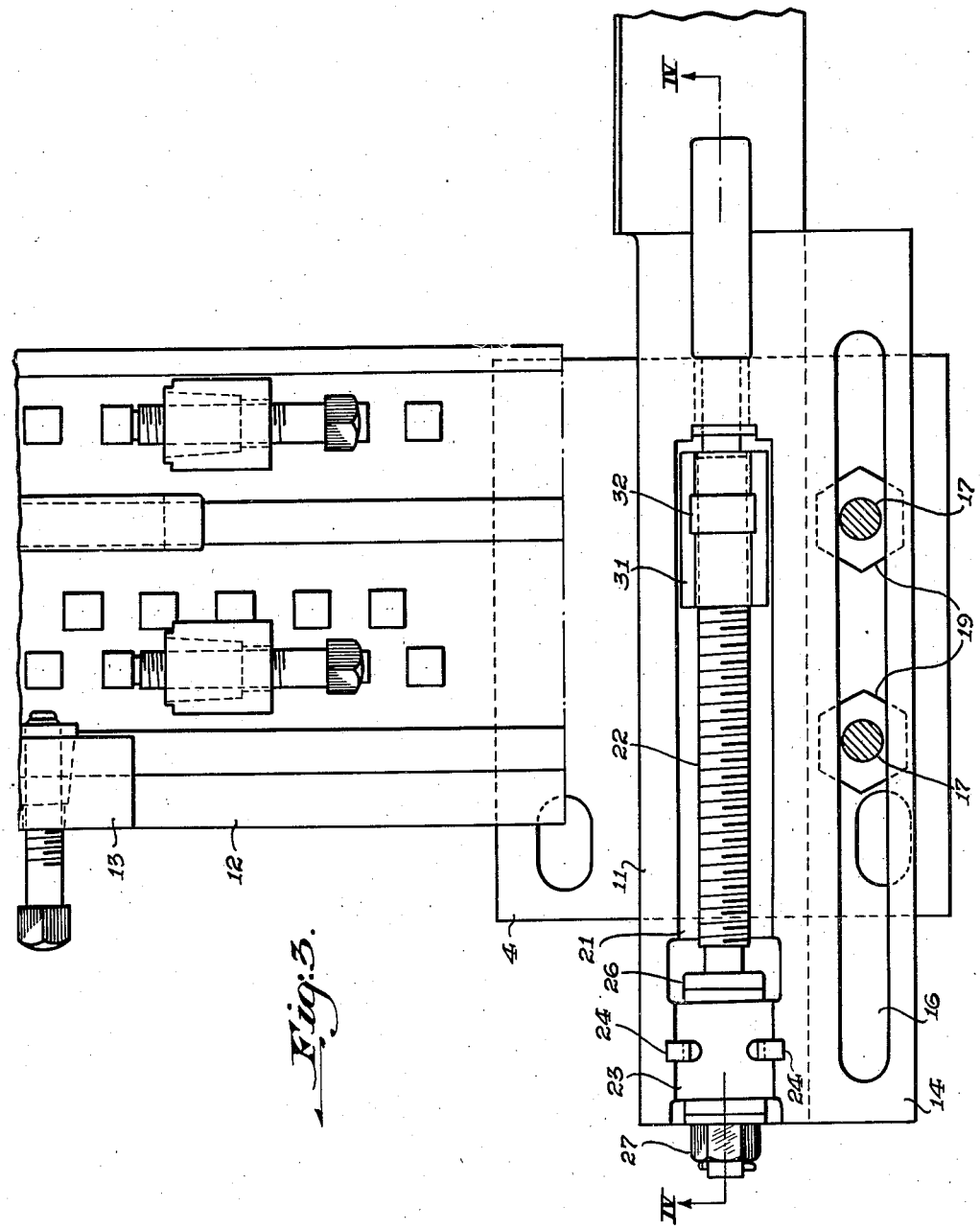
WITNESSES:
E. J. Maloney.
V. A. Peckham.
INVENTOR
Wentzel R. Duda
BY
Brown, Critchlow & Flick
his ATTORNEYS.

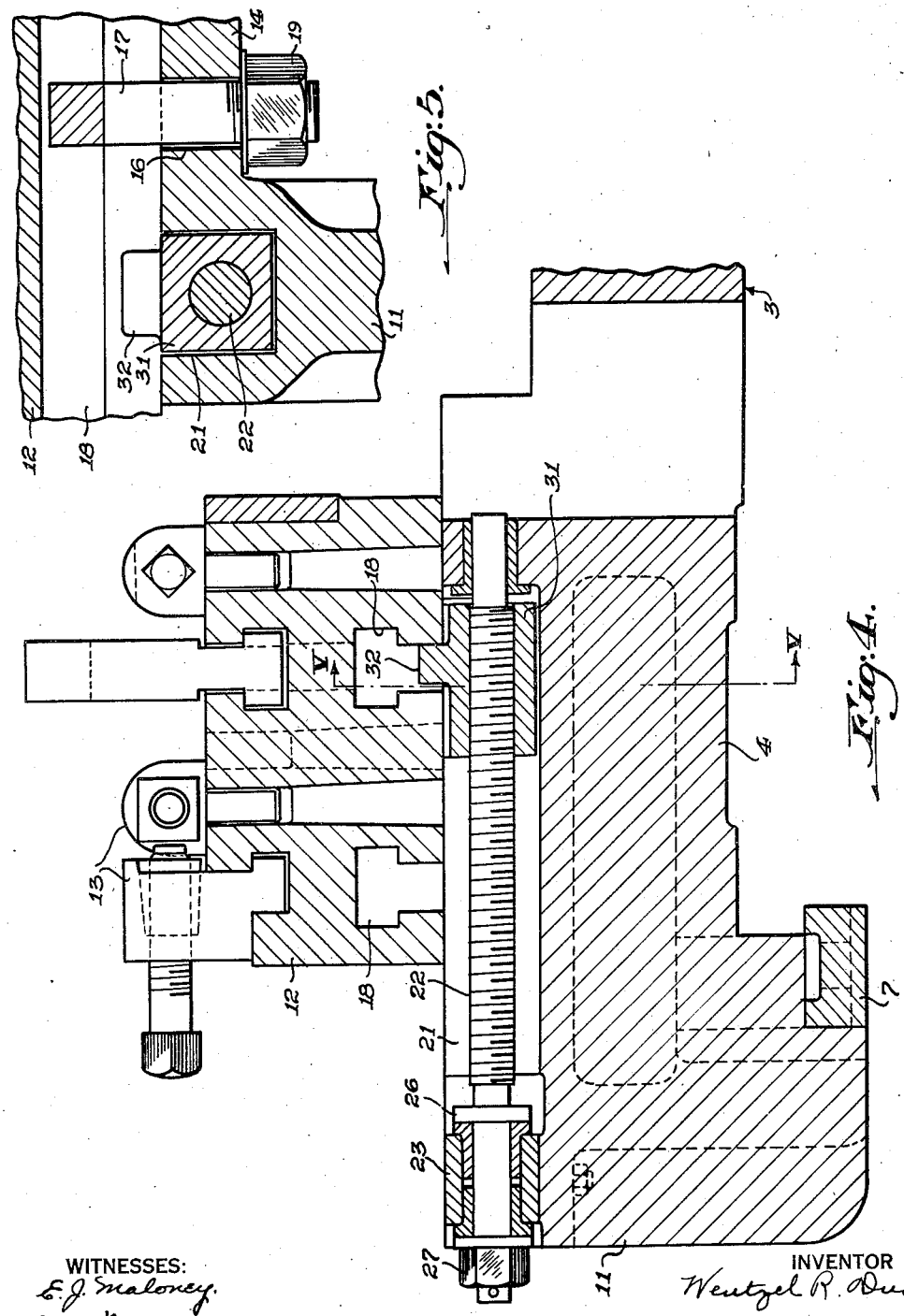

Patented Dec. 31, 1946

2,413,489

UNITED STATES PATENT OFFICE 2,413,489

ROLL LATHE

Wentzel R. Duda, Mount Lebanon, Pa.

Application August 2, 1945, Serial No. 608,537

3 Claims. (Cl. 82—21)

This invention relates to roll lathes in which rolling mill rolls are turned.

In turning the bodies of mill rolls their necks are supported in journals carried by a pair of vertical end housings that are adjustable toward and away from each other to accommodate rolls of different lengths. In general these housings are provided with projections on their front or operator's side for supporting a horizontal beam, known as the "piano rest," on which the turning tool is adjustably mounted. In order to turn rolls of various diameters the piano rest is adjustable toward or away from the center of the lathe to keep it as close as possible to the roll so that the tool will be firmly supported. This adjustment usually is accomplished by means of long horizontal screws threaded through large lugs extending up in front of the piano rest from the housing projections below it.

In turning long rolls, it often is possible for the operator to stand between the two housing lugs and the adjusting screws projecting from them. In this position he can easily see the position of the tool against the roll. However, in turning short rolls where it is necessary to move the housings closer together, the operator is held away from the roll by the beam-adjusting screws in front of him. These projecting screws not only are objectionable in that they keep the operator from properly viewing the cutting edge of the tool, but they are in a position that is extremely dangerous to the operator. Serious injuries have been suffered by operators being accidentally thrust against these protruding screws.

It is among the objects of this invention to provide a roll lathe in which the screws that adjust the position of the piano rest do not project dangerously from the housings, in which the end housings do no project forward beyond the piano rest when it is located farthest from the center of the machine, and in the operation of which the operator can stand closer to the roll being turned than heretofore when the housings are close together.

In accordance with this invention a pair of spaced vertical housings for rotatably supporting the necks of a mill roll are adjustable toward and away from each other on a suitable bed. The housings have forward projections for supporting a horizontal beam resting on top of them in sliding contact with them. Each projection is provided with a slot in its top extending lengthwise thereof under the beam. An adjusting screw is journaled in the slot and protrudes only far enough from the front of the housing projection to provide an end that can be turned by a wrench or the like. Mounted on the screw in the slot is a nut that can not turn with the screw, but that can move lengthwise of the slot. The nut has a lug on top projecting up into a slot in the bottom of the beam. This slot extends lengthwise of the beam and may also receive bolts by which the beam may be anchored to the housings while the lathe is operating. Adjustment of the beam is effected by turning the adjusting screws which cause the nut lugs to move the beam laterally toward or away from the center of the lathe. The usual tool holders are adjustably mounted on top of the beam. With this construction there is no reason to have the screws and housing projections extend forward appreciably beyond the beam when it is in its most forward position.

Figure 2:
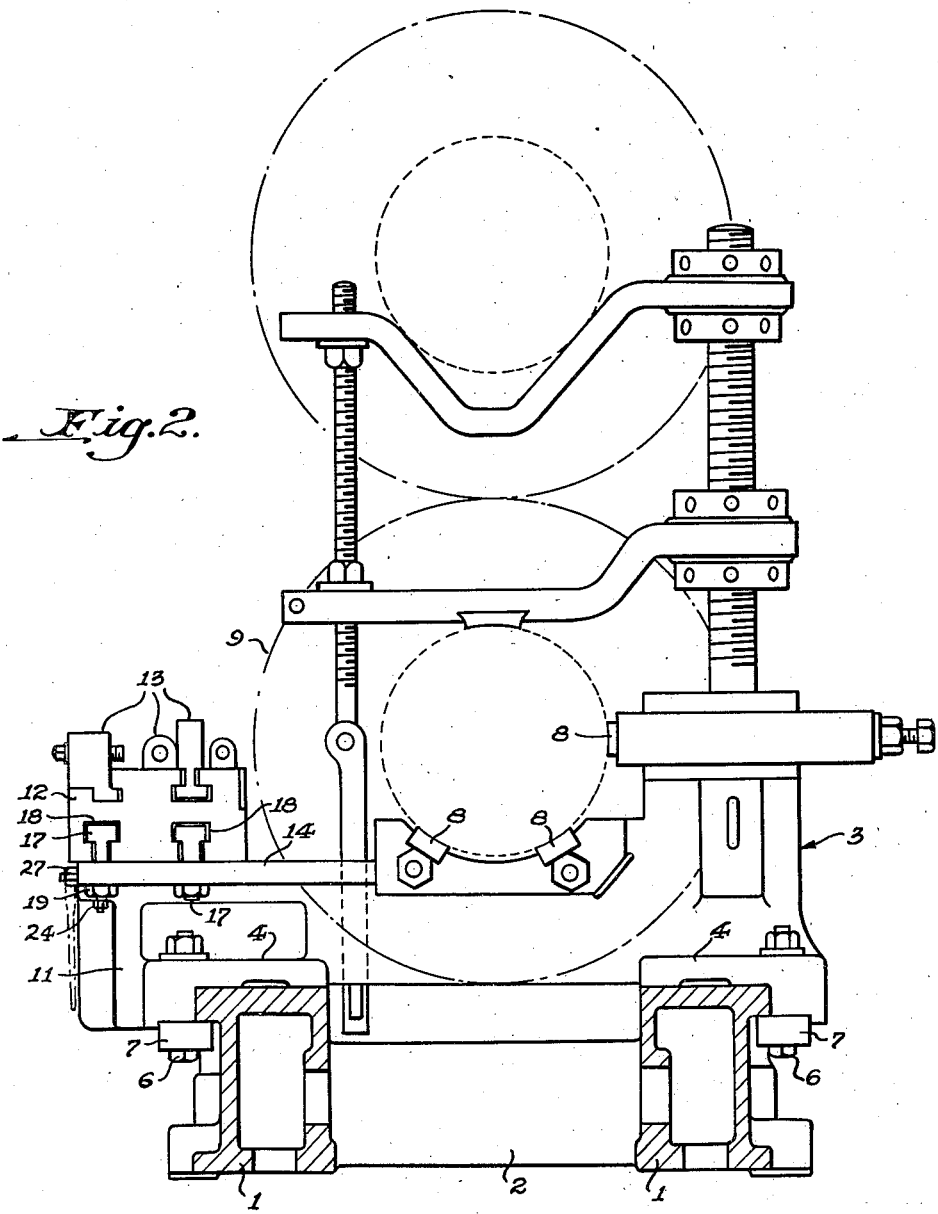

The preferred embodiment of the invention is illustrated in the accompanying drawings in which Fig. 1 is a front view of my improved lathe; Fig. 2 is an end view thereof; Fig. 3 is an enlarged plan view of one of the housing projections; Fig. 4 is a vertical section taken on the line IV—IV of Fig. 3; and Fig. 5 is a fragmentary vertical section taken on the line V—V of Fig. 4.

Referring to Figs. 1 and 2 of the drawings, a machine bed, mounted on a suitable foundation, is formed from a pair of spaced parallel girders 1 rigidly connected by cross members 2. Slidable lengthwise of the bed is a pair of housings 3 for supporting mill rolls that are to be turned. Each housing has a front and rear foot 4 resting on top of the girders and extending down across the faces of horizontal flanges with which the tops of the girders are provided. The housings are held in adjusted positions along the bed by means of bolts 6 extending through their feet and through clamping bars 7 that engage the lower surfaces of the girder flanges. Each housing is provided with the usual adjustable bearing blocks 8 forming a journal for the neck of a roll 9 that is being turned in the lathe. The roll is rotated in the journals by suitable conventional driving means (not shown) also mounted on the bed.

The lower portion of each housing is provided with a forward projection 11 integral with its front foot 4 from which it extends forward a short distance. The upper surfaces of these projections are flat and support a horizontal beam 12 slidably mounted thereon in front of roll 9. This beam is the usual heavy rectangular member or "piano rest" on which are adjustably mounted the holding members 13 that support a turning tool (not shown) in any desired position. At one side of the top of each housing projection there is a lateral flange 14 provided with a vertical slot 16 through it extending crosswise of the beam above it, as shown in Fig. 3. Bolts 17 extend down through these slots with their heads retained in a pair of parallel T-slots 18 with which the bottom of the beam is provided. These T-slots extend lengthwise of the beam so that the bolts can be moved along it when the housings are adjusted toward or away from each other. The slots 16 in flanges 14 permit the bolts to move lengthwise of the housing projections when the beam is adjusted toward and away from the center of the machine. While the lathe is operating, the beam is anchored to the housing by means of nuts 19 screwed on the lower ends of bolts 17.

In accordance with this invention adjustment of beam 12 laterally is accomplished in the following manner. As shown in Figs. 3, 4, and 5, the top of each housing projection is provided with a slot 21 having an open outer end and extending lengthwise of the projection for most of its length. Journaled in this slot is an adjusting screw 22. Preferably, the inner end of the screw is journaled in an opening formed in the wall at the inner end of the slot, while the outer end portion of the screw is journaled in a bearing 23 anchored in the slot by means of anchor bolts 24. An integral collar 26 on the screw engages the inner end of this bearing to prevent the screw from moving lengthwise out of the slot. The outer end of the screw projects only far enough from the front face of the housing projection to receive a nut 27 that is rigidly mounted thereon to form a head for receiving a removable wrench, indicated in broken lines, by which the screw can be turned.

Disposed in housing slot 21 and threaded on the adjusting screw, is a relatively long nut 31 of such size and shape that it can not turn in the slot and therefore must move lengthwise of the screw when the screw is turned by a wrench. This nut is provided with an integral lug 32 that extends loosely up into one of the T-slots 18 in the bottom of the horizontal beam. Consequently, when the two adjusting screws are turned, after anchor bolts 17 have been loosened, the nuts 31 are moved along the slots in one direction or the other and the lugs 32 on the nuts thereby push the beam toward or away from the center of the machine to position the upper inner edge of the beam as close as possible to the roll being turned. When the housings are adjusted toward or away from each other the nut lugs 32 slide lengthwise of the T-slot 18 in which they are disposed.

The housing projections are only long enough to permit the beam to be moved outwardly the desired maximum distance. Accordingly, the front ends of these projections need not be positioned in front of the front face of the beam when it is in its most forward position. In fact, it is satisfactory for the beam to project a short distance beyond the front ends of the projections. Because of this, there are no projections in front of the piano rest when it is in its outermost position, and there are no adjusting screws projecting beyond the piano rest at any time. The danger of injuring the operator by such screws therefore is eliminated, and he can stand close to the piano rest even when the roll housings are close together.

According to the provisions of the patent statutes, I have explained the principle and construction of my invention and have illustrated and described what I now consider to represent its best embodiment. However, I desire to have it understood that, within the scope of the appended claims, the invention may be practiced otherwise than as specifically illustrated and described.

I claim:

1. A roll lathe comprising a pair of spaced vertical housings for rotatably supporting the necks of a mill roll, said housings being adjustable toward and away from each other and each having a forward projection provided with a slot in its top extending lengthwise thereof, an adjusting screw journaled in said slot and protruding only slightly from the front end of the slot to provide an end for turning the screw manually, a non-rotating nut mounted on the screw in the slot and provided with a lug on top, a beam resting slidably on said projections and provided in its bottom with a slot extending lengthwise thereof receiving said lugs, whereby turning of said screws will cause said lugs to adjust the beam lengthwise of the housing projections, and means on said beam for holding a tool against said roll.

2. A roll lathe comprising a pair of spaced vertical housings for rotatably supporting the necks of a mill roll, said housings being adjustable toward and away from each other and each having a forward projection provided with a slot in its top extending lengthwise thereof, an adjusting screw journaled in said slot and protruding only slightly from the front end of the slot to provide an end for turning the screw manually, a non-rotating nut mounted on the screw in the slot and provided with a lug on top, a beam resting slidably on said projections and provided in its bottom with a T-slot extending lengthwise thereof receiving said lugs, whereby turning of said screws will cause said lugs to adjust the beam lengthwise of the housing projections, said projections being provided with lateral flanges having slots therethrough extending lengthwise of the projections, bolts extending through said flange slots with their heads disposed in said T-slot for bolting the beam to the housing projections, and means on said beam for holding a tool against said roll.

3. A roll lathe comprising a pair of spaced vertical housings for rotatably supporting the necks of a mill roll, said housing being adjustable toward and away from each other and each having a forward projection provided with a slot in its top extending lengthwise thereof, an adjusting screw journaled in said slot and protruding only slightly from the front end of the slot to provide an end for turning the screw manually, a non-rotating nut mounted on the screw in the slot and provided with a lug on top, a beam resting slidably on said projections and provided in its bottom with a slot extending lengthwise thereof receiving said lugs, whereby turning of said screws will cause said lugs to adjust the beam lengthwise of the housing projections, the front side of the beam being located above the front faces of said projections when the beam is in its most forward position, and means on said beam for holding a tool against said roll.

WENTZEL R. DUDA.